Aug. 25, 1964     D. PERLMAN     3,146,400
KEYED FILTER EMPLOYING A CRYSTAL AS INTEGRATING ELEMENT
Filed June 18, 1962     5 Sheets-Sheet 1

INVENTOR.
DAVID PERLMAN

BY

ATTORNEYS

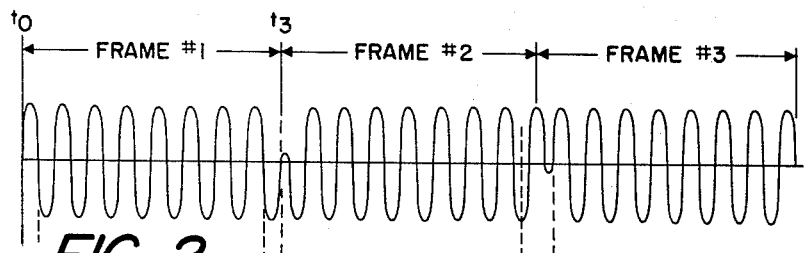
FIG 2
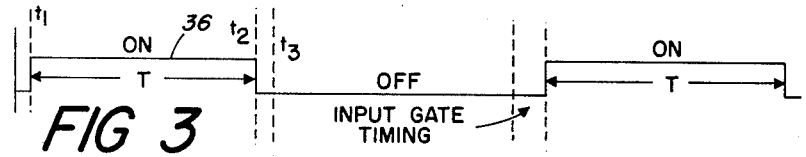
FIG 3 INPUT GATE TIMING
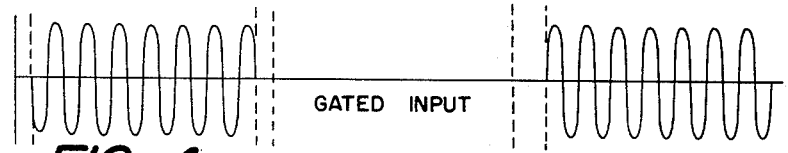
FIG 4 GATED INPUT
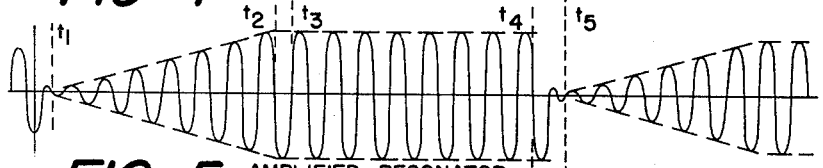
FIG 5 AMPLIFIED RESONATOR OUTPUT
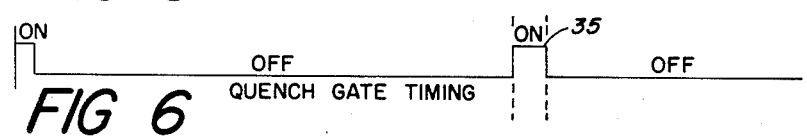
FIG 6 QUENCH GATE TIMING
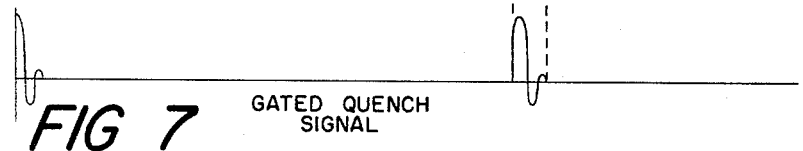
FIG 7 GATED QUENCH SIGNAL
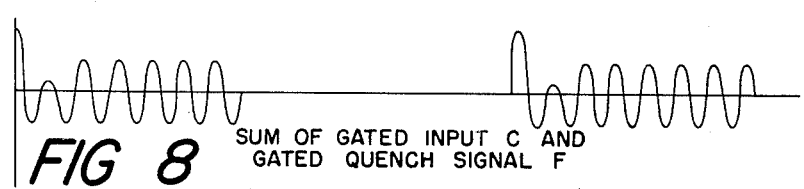
FIG 8 SUM OF GATED INPUT C AND GATED QUENCH SIGNAL F
INVENTOR.
DAVID PERLMAN
BY Moody and Phillion
ATTORNEYS

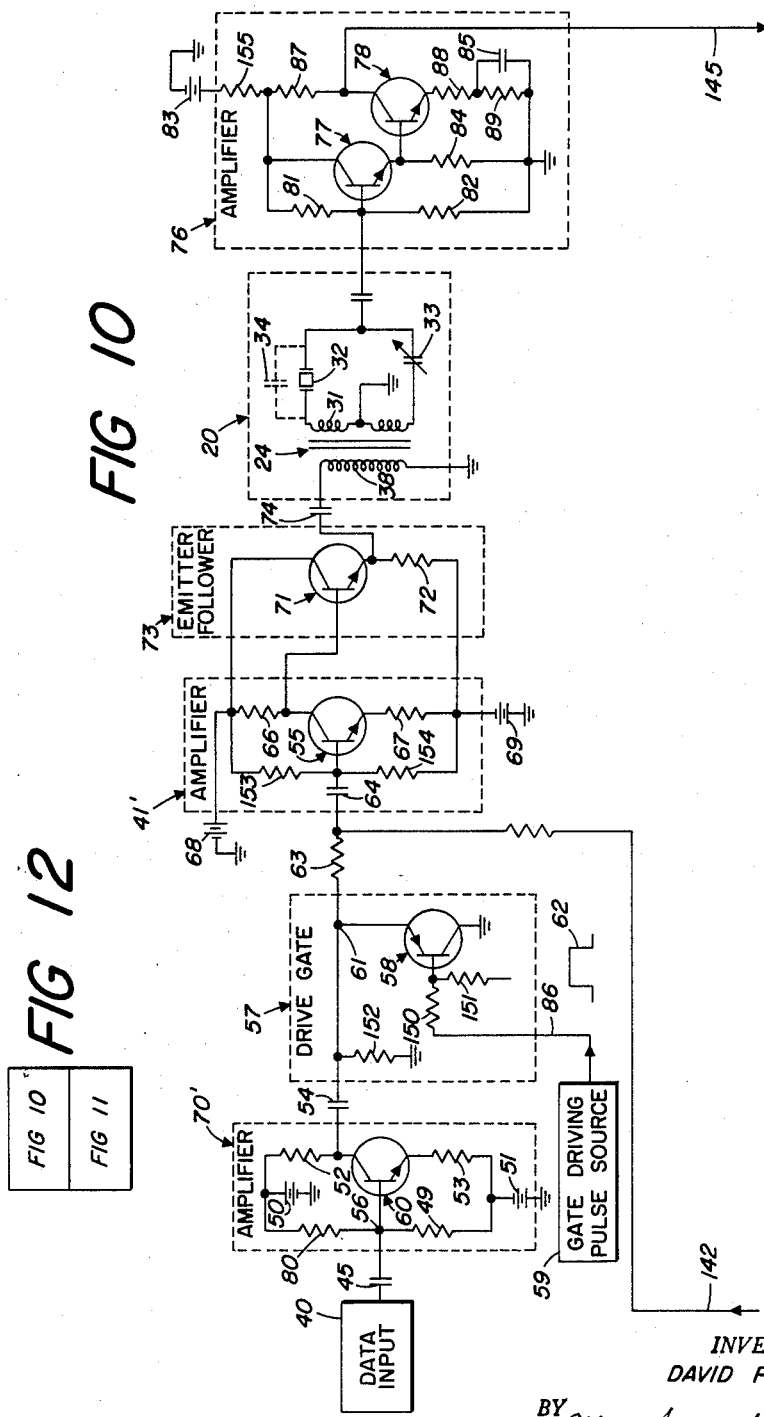

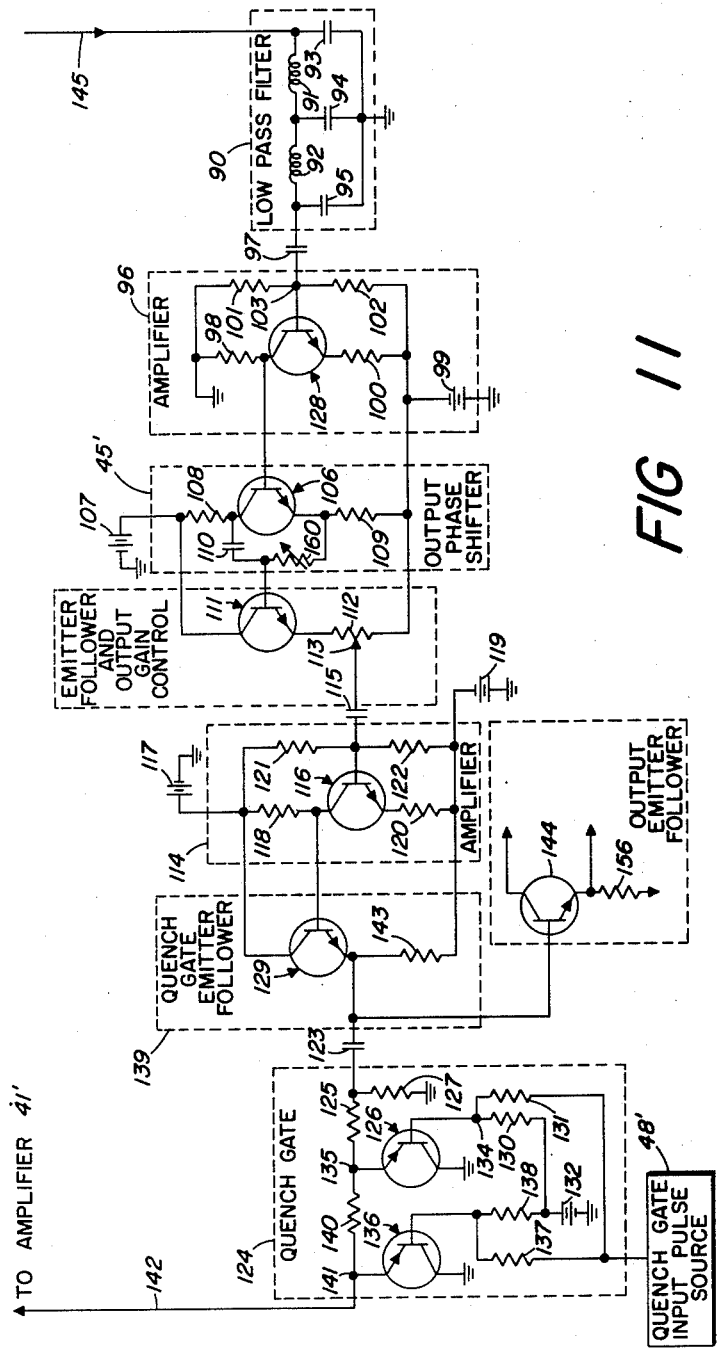

3,146,400
KEYED FILTER EMPLOYING A CRYSTAL AS INTEGRATING ELEMENT
David Perlman, Corona Del Mar, Calif., assignor to Collins Radio Company, Cedar Rapids, Iowa, a corporation of Iowa
Filed June 18, 1962, Ser. No. 203,351
2 Claims. (Cl. 328—27)

This invention relates, generally, to keyed filters of the type described in United States Patent No. 2,825,808, issued to Melvin L. Doelz et al. and entitled "Keyed Filter," and, more particularly, to a keyed filter employing a crystal as the resonating element.

In the following several paragraphs a general discussion of prior art keyed filters will be given to give the reader a background so that the description of the invention and its advantages over the prior art will be better understood.

In some data transmission systems information is represented by the relationship of the phase of a tone signal with respect to some reference phase. Such reference phase may be the phase of tone signal carrying the immediately preceding bit of information, or it may be the phase of a signal transmitted independently of the data-carrying signal. As shown in United States Patent No. 2,833,917, issued to D. F. Babcock, entitled "Locking Oscillator Phase-Pulse Generator" and incorporated herein by reference, there is described the means for encoding more than a single channel of information on a given carrier tone also referred to herein as a tone signal. Such patent further describes the bit-synchronous manner of encoding wherein each bit of information is contained within a given predetermined interval of time which is equal in duration to the other intervals of time containing the other bits of transmitted data. Each of said intervals of time follow one another in a continuous sequence. By proper means, as described in United States Patent No. 2,984,701 issued to George H. Barry on May 16, 1961, there is shown a means for extracting a synchronizing signal from a bit-synchronous received signal so that the various time intervals, each containing a bit of information, can be identified, one from the other.

In United States Patent No. 2,905,812 issued to M. L. Doelz et al. on September 22, 1959, and entitled "High Information Capacity Phase-Pulse Multiplex System," there is discussed in detail means for transmitting and receiving a series of tones each having a different frequency and if desired each carrying more than one channel of information. At the receiver there are employed a plurality of keyed filters. In some systems currently being used, two keyed filters are employed for each tone. Each of said keyed filters is tuned to the frequency $f_0$ of the tone with which it is associated. As will be discussed later herein, the various tones employed in the system are made to differ in frequency by an integral multiple of a selected difference frequency. For example, the tones employed may be frequencies of 20 kc., 19.5 kc., 19.0 kc., 18.5 kc. and 18.0 kc. It will be observed that the difference between any two of these frequencies is 500 c.p.s., or integral multiple of 500 c.p.s. The period $\tau$ of one complete cycle of the 500 c.p.s. difference frequency is 1/500 second, or two milliseconds. If a resonator tuned to one of said given frequencies, for example 19.0 kc., is driven by a tone having a frequency of 18.5 kc., the kinetic energy (i.e. oscillations) of the resonator will build up during the initial part of said period $\tau$ and will then decline to produce a null at the end of a period $\tau$. Qualitatively speaking, the reasons for such a null (or node) are as follows. As the 18.5 kc. tone is applied to a nonexcited resonator at time $T_0$, oscillatory vibration will be induced in the resonator by the applied signal (assuming the resonator to be a mechanical resonator for purposes of discussion). However, since the resonator's natural resonant frequency is 19.0 kc., the actual frequency of harmonic motion of the resonator will be approximately the average of the input frequency and the resonant frequency. However, since the applied input signal has a frequency of 18.5 kc. the phase of the applied signal will deviate in an increasing amount from the phase of the harmonic motion of the resonator and will eventually begin to oppose the motion of the resonator. When half the period $\tau$ has elapsed, the harmonic motion of the resonator is near its peak, but the phase of the applied input signal is now 90° out of phase with the motion of the resonator and will no longer increase oscillatory motion. When the phase difference exceeds 90°, the input signal will begin to suppress the harmonic motion of the resonator. Such suppression will continue until the end of the period $\tau$, at which time, in a theoretically lossless resonator, the harmonic motion will be of zero amplitude, the energy of the applied signal being employed to build up oscillations in the resonator being equal to the energy employed to suppress such oscillations.

Similarly, if a tone having a frequency which differs from the frequency of the keyed filter to which it is applied by an integral multiple, is supplied to said keyed filter a node will appear at the end of the period $\tau$. However, in the case where the difference frequency is a multiple of 500 cycles per second, more than one node will appear during the period $\tau$, the number of nodes being equal to the multiplying factor. For example, if the difference frequency is 1,000 cycles per second, the number of nodes appearing during the period will be two, the second node appearing at the end of the period $\tau$ and coinciding with the node created by a tone having a difference frequency of only 500 cycles per second.

If, however, the tone applied to the keyed filter has a frequency equal to the tuned frequency of the tuned filter, a different result is reached. Since the frequencies are the same, the total energy of the applied input signal for the period $\tau$ will be employed to increase the amplitude of the harmonic motion of the resonator. The resonator is, in fact then, a means for integrating the energy supplied thereto by the applied signal, the amplitude of the harmonic motion being proportional to the total energy supplied.

A further characteristic of the keyed filter is that the phase of the applied signal is integrated over the driving period $\tau$ so that perturbations of phase of any given cycle occurring in the received input signal become of much less importance, since the phase of many cycles is averaged into the phase of the harmonic motion of the resonator.

Thus it can be seen that a keyed filter operated in a bit-synchronous manner can be driven for a period $\tau$ as defined above, at which time all of the tones received, except that particular tone to which the keyed filter is tuned, will have produced a null in the oscillatory motion of the resonator. Thus, if the received input tones are, at the end of the period $\tau$, removed from the input of the resonator, the resonator will continue to resonate freely only at the frequency of the selected tone and with the phase of the selected tone.

As described in the above-mentioned United States Patent No. 2,833,917, the keyed filters are frequently used in pairs in an alternate manner. That is to say, a first keyed filter is employed to receive a given data bit and is driven for a bit period $\tau$, and is then allowed to resonate freely. Immediately upon the termination of the first received bit, the input signal is supplied to the second keyed filter which is tuned to the same frequency as the first keyed filter. The second keyed filter is driven by the input signal for the duration of the next succeeding bit, during which time the first keyed filter is resonating with a phase equal to that of the first received bit. The phase of the second received bit is then compared with the phase of the first resonator as a reference to determine the information contained in the second bit.

In the aforementioned United States Patent No. 2,825,808, the keyed filter employs a mechanical resonator which requires a positive feedback during the driving time of the resonator in order to insure linear buildup of the harmonic motion of the resonator, since a mechanical resonator is a relatively high loss device. A difficulty with the positive feedback arrangement is that it is quite critical since it must be a relatively high gain circuit due to the high loss characteristic of the resonator, but yet the gain must not be so great that the system would be thrown into a state of oscillation, thereby defeating the purpose of the device.

It might also be noted that the keyed filter of the Doelz patent requires a fairly critical negative feedback type quenching circuit which functions to quench the harmonic motion of the resonator after a given period of time so that the keyed filter can be employed to receive another bit. While the keyed filter of Doelz has proven to be highly successful and has been extensively used commercially, it is a somewhat expensive device and, as indicated above, requires fairly critical positive and negative feedback circuits. Furthermore, it often has been found necessary to control the temperature of the mechanical resonators by some type of oven arrangement since their frequency is somewhat temperature sensitive.

It is an object of the present invention to provide an improved keyed filter which does not require a critical quenching circuit and which requires no positive feedback circuit.

A further aim of the invention is a more inexpensive and more reliable keyed filter than has heretofore been known.

Another object of the invention is to provide a keyed filter which does not require the degree of temperature stabilization that is required by the mechanical resonators heretofore employed.

A further purpose of the invention is the improvement of keyed filters, generally.

In accordance with the invention, the keyed filter comprises a crystal having an input circuit means and an output terminal, and having a resonant frequency $f_0$. A gating means is provided to supply an input data signal to the input circuit of the crystal at desired periodic intervals of time, said intervals of time corresponding to the driving time of the keyed filter, as discussed above. Connecting the output terminal of the crystal to the input terminal of the crystal resonator is a negative feedback circuit which performs a function of quenching the resonating crystal at a desired time so that the crystal resonator may receive a new bit of information data. The said negative feedback circuit comprises amplifying means, means for shifting the phase of the output signal so that it is 180° out of phase with the resonant condition of the crystal, and also comprises a quench gate timing circuit for properly timing the opening and closing of the negative feedback circuit.

A principal feature of the invention lies in the fact that no positive feedback circuit is required since the crystal resonator circuit is a relatively high Q, low loss device and the accumulation (integration) of kinetic energy therein will be sufficiently linear to serve as an energy integrator, which is a primary function of the keyed filter.

Another important feature of the invention is the fact that the negative feedback or quenching circuit is relatively noncritical as compared to the negative feedback or quenching circuit necessary with the mechanical resonator of the type used heretofore.

The above-mentioned and other objects and features of the invention will be more fully understood from the following detailed description thereof when read in conjunction with the drawings in which:

FIGS. 2 through 8 show curves of signals appearing at various points in the invention over several frames of data input;

FIGS. 10 and 11 together constitute a fairly detailed schematic diagram of the invention; and FIG. 12 is a diagram showing how FIGS. 10 and 11 should be fitted together.

Figure 1:
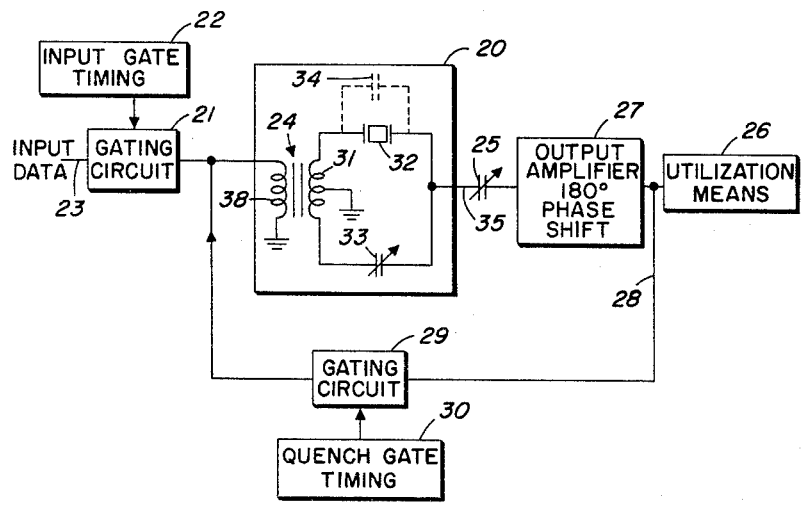
FIG. 1 shows a combination block diagram and schematic diagram of a simplified form of the invention.

Referring now to FIG. 1, the structure within the block 20 represents the crystal resonator circuit which functions to select the particular one of the tones whose frequency equals the resonant frequency of the resonator. The block 21 is a gating circuit which is opened peridically (so that input data signals may pass therethrough) by proper input gating pulses from a timing source 22. The gating circuit 21 then functions to supply the data appearing on the input lead 23 to the input transformer 24 of the resonator 20. Connected to the output terminal of the resonator 20 is a variable capacitor 25 which can be employed to adjust the frequency of the resonator. Connected between the variable capacitor 25 and the utilization means 26 is an output amplifier 27, which functions to amplify the output signal from the resonator and also to shift its phase by 180°. A portion of the phase shifted output signal of amplifier 27 is then supplied back to the input of the resonator 20 through a second gating circiut 29 which is timed by quench gate timing circuit 30. The function of the quench gate timing circuit 30 is to supply a quenching pulse to the resonator at the termination of a particular frame as will be discussed in detail hereinafter, thus readying the resonator circuit for its next subsequent cycle or frame of operation.

In the resonator 20 the secondary winding 31 of input transformer 24 is center tapped to ground potential with one end terminal thereof being connected to the crystal 32 and the other end terminal thereof being connected to the output terminal of the resonator circuit through the variable capacitor 33. The purpose of the variable capacitor 33 is to coact with the lower half of the secondary winding 31 to cancel out that portion of the current passing through the upper half of the winding and the inherent parallel capacitance 34 of the crystal 32. More specifically, the current passing through the inherent capacitance 34 is out of phase with the resonant signal existing in ht reyctas nvehml AR
existing in the crystal 32 and would ordinarily produce phase distortion at the output of resonator 20. However, if the capacitor 33 is made to be equal in value to the capacitor 34, the current therethrough will be equal to, but opposite in phase with, the current through the capacitor 34, so that the two currents will cancel each other at the output terminal 35. The specific reason that said two currents will be oppositely phased is because the signals appearing at the end terminals of the secondary winding 31 of transformer 24 are oppositely phased.

For a general understanding of the operation of the keyed filter shown in FIG. 1, reference is made to the curves of FIGS. 2 through 8. FIG. 2 shows three frames of the data input. A frame time is defined as a bit period. Let it be assumed that alternate frames are supplied to the resonator shown in FIG. 1, the remaining frames being supplied to a second resonator (not shown) in accordance with the specification of the above-cited United States Patent No. 2,833,917.

At time $t_1$ the gate 21 of FIG. 1 is opened by the pulse 36 of FIG. 3 supplied by the gate timing pulse source 22 of FIG. 1. The data input in frame #1 is then supplied to the primary winding 38 of transformer 24 until time $t_2$, at which time the timing pulse 36 terminates, thus closing the gate 21. The time interval $t_1-t_2$ is defined as the driving time of the resonator. The curve of FIG. 4 represents the portion of the supplied input data supplied to the resonator 20 during the time $t_1-t_2$. As discussed hereinbefore, the resonator 20 will respond to the supplied signal to build up an oscillation therein having a frequency equal to that of the supplied signal (which equality of frequency was predetermined), and whose phase is locked substantially to that of the applied input data signal. Since the crystal 32 represents a low loss device the increase in amplitude of the associated signal created therein will be nearly linear when a constant amplitude signal is supplied thereto. Such linear rise in the amplitude of the oscillations induced in the crystal 32 is shown between the times $t_1$ and $t_2$ of the curve of FIG. 5. At time $t_2$ when driving input signal is cut off, the low loss resonator 20 will continue to resonate at near constant amplitude until time $t_4$ at which time a quench gate timing pulse 35 of FIG. 6 will be supplied to the gate 29 of FIG. 1 to open said gate 29 and permit the signal appearing at the output of amplifier 27 to be supplied back to the input of resonator 20. Since the signal appearing at the output of amplifier 27 has a phase 180° removed from that of the driving input signal, the oscillation of the crystal 32 will be quenched. The actual quenching signal is shown in FIG. 7. Specifically, the quenching signal 37 occurs during the quenched gate timing pulse 35 of FIG. 6. Due to the fact that the quench pulse is derived directly from the output of the resonator, the amplitude of the quenching pulse will fall off sharply, as shown in FIG. 7, as quenching occurs. In FIG. 8 there is shown the sum result of the curves of FIGS. 7 and 4, which are supplied to the input transformer 24 of the resonator 20.

It will be observed that the frame time $t_0-t_3$ begins before and ends after the duration of the driving pulse 36. Similarly, frame #2 begins before and ends after a drive pulse (not shown) for a second resonator (not shown). During the time intervals existing between drive pulses, the quench gate timing pulses occur. Further, such time intervals between adjacent drive pulses assure that phase transition between frames of received signal can occur completely before the driving occurs.

Figure 9:
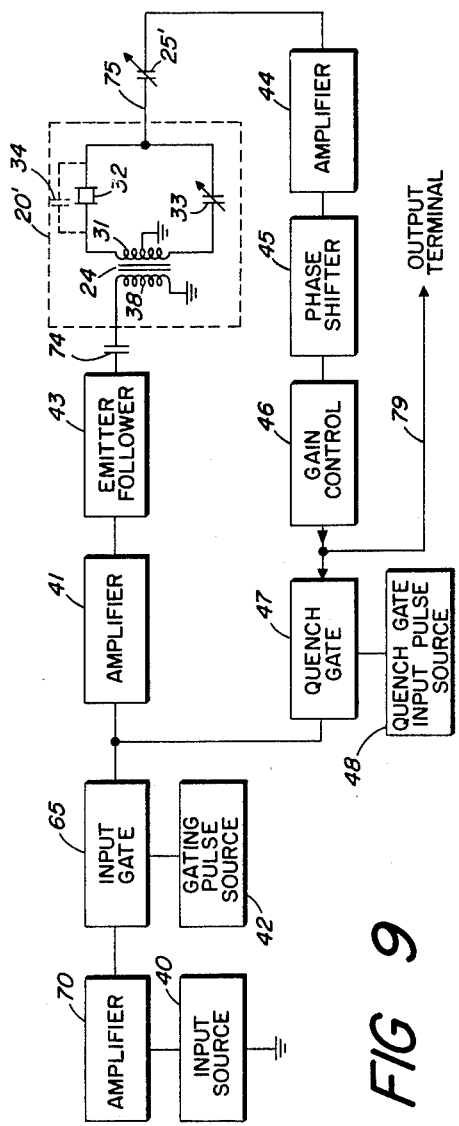
FIG. 9 is a combination schematic and block diagram of the invention and is somewhat more complete than the one shown in FIG. 1.

Referring now to FIG. 9, there is shown a more detailed block diagram in the circuits used in conjunction with the resonator to produce the keyed filter. An input source 40 provides a data input signal consisting of time synchronous bits of information (also referred to herein as bit synchronous information) to the amplifier 70 and then to the input gate 65. The data will pass through the gate 65 to the amplifier 41 only when the gate 65 is opened by a gating pulse from a gating pulse source 42. As discussed in connection with FIGS. 1, 2, and 7, the duration of a gating pulse (which is the driving pulse) is less than the frame time of a data bit, the gating pulse beginning after the beginning of a frame time and ending before the ending of a frame time. During the existence of the gating pulse, the data input signal is supplied to the amplifier 41 and then to the emitter follower 43 which, in turn, provides an output signal to drive the primary winding 38 of transformer 24 through coupling capacitor 74. The emitter follower 43 is employed since it presents a low source impedance to the low impedance of the transformer 24. The function of the resonator 20 is the same as described in connection with FIG. 1 in that it will select a particular tone of the plurality of tones ordinarily contained in the input source 40. The envelope of the tone appearing on the output terminal 75 is as shown in FIG. 5, as discussed hereinbefore. Such tone is amplified by amplifier 44 and then shifted in phase by phase shifter 45 so that the phase differs from the phase of the input signal by 180°. The output signal of the phase shifter 45 is supplied to a gain control circuit 46 which functions to control the gain of the circuit. From the gain control circuit 46 the signal is applied to two circuits. One of these circuits consists of the output terminal 79 which may go to suitable data processing equipment, not shown. The second circuit is a feedback circuit including the quench gate 47 which is controlled by the quench gate input pulse source 48. More specifically, the quench gate 47 is normally closed so that no signal from the gain control 46 can be supplied back to the amplifier 41. However, when the quench gate input pulse is supplied from block 48, the quench gate 47 will be opened thereby to permit the output signal from gain control circuit 46 to pass to the amplifier 41. Such feedback signal will then be amplified by the amplifier 41 and supplied to the resonator 20 through the emitter follower 43. The phase of the feedback signal will be 180° removed from the phase of the harmonic oscillations occurring in the resonator 20. Quenching will then occur, as shown in the curves of FIGS. 5, 6, 7, and 8, during the time interval $t_4-t_5$.

Referring now to FIG. 10, there is shown a detailed schematic sketch of a specific embodiment of the invention. The data input is supplied from the source 40 through a coupling capacitor 45 to an input buffer amplifier 70′. The amplifier 70′ consists of an NPN type transistor 60 having a collector electrode, a base electrode, and an emitter electrode. Resistors 80 and 49 form a voltage divider across plus battery source 50 and minus battery source 51. The tap 56 on said voltage divider is connected to the base of the transistor and is selected to provide the proper operating bias for said base electrode. Resistors 52 and 53 are connected, respectively, in the collector and emitter circuits of transistor 60. A coupling capacitor 54 functions to supply the output signal appearing at the collector of transistor 60 to the base of transistor 55 of amplifier 41′ through isolating resistor 63 and coupling capacitor 64. Between the amplifier 70′ and the amplifier 41′ there is provided a gate circuit 57 which includes a variable impedance in the form of transistor 58. Under normal circumstances, i.e., in the absence of a driving pulse from source 59, the potential of gate input lead 86 is negative so that the potential of the base of transistor 58 is minus with respect to the emitter. Thus, the transistor 58 is conductive and provides an effective low impedance to ground from the terminal 61, thus shunting to ground any output signal from amplifier 70′. When a driving pulse, such as pulse 62, is supplied to the driving gate input lead 86, the potential of the base is raised above cut-off so that the transistor 58 provides a high impedance to junction 61, thus allowing the data from amplifier 70′ to pass through the isolating resistor 63 and coupling capacitor 64 to the base of transistor 55. The transistor 55 has its collector and emitter electrodes connected, respectively, to plus battery source 68 and minus battery source 69 through resistors 66 and 67, respectively. Resistors 153 and 154 form a voltage divider to supply the correct biasing potential to the base of transistor 55.

From the amplifier 41′ the output signal is taken from the collector of transistor 55 and supplied to the base of transistor 71 which has a resistor 72 connecting its emitter electrode to the minus battery source 69 in an emitter follower arrangement. The output signal across the emitter follower resistor 72 is supplied through coupling capacitor 74 to the primary winding 38 of transformer 24. Since the operation of the modulator 20 has been discussed hereinbefore it will not be discussed again. From the resonator 20 the selected tone signal is supplied to an amplifier 76 which consists of a driver transistor 77 having an emitter follower resistor 84 output arrangement for supplying a signal to the output transistor 78. Resistors 81 and 82 form a voltage divider between the plus battery source 83 and ground potential to provide the proper biasing potential for the base of transistor 77. The resistors 87, 88, and 89 function as load resistors in the collector and emitter circuits of transistor 78 with the resistor 89 being shunted by capacitor 85 to lessen the degeneration that accompanies the presence of a resistor in the emitter circuit.

The output signal from the amplifier 76 is supplied via lead 145 to two-stage low-pass filter circuit 90 consisting of inductors 91 and 92 and capacitors 93, 94, and 95. This low-pass filter functions to remove high frequency components above the tone frequency. From the low-pass filter 90 the signal is supplied through coupling capacitor 97 to amplifier 96 which consists of an NPN type transistor 128 having its collector connected to ground potential through resistor 98 and its emitter connected to minus battery source 99 through resistor 100. Resistors 101 and 102 form a voltage divider across the battery source 99 having a tap 103 thereon to which the base of transistor 128 is connected. The said voltage divider functions to provide a proper base potential for said base. From the amplifier 96 the signal is supplied to the phase shifter 45' which functions to shift the phase 180°. The phase shifter 45' is comprised of an NPN type transistor 106 having its collector connected to positive battery source 107 through resistor 108 and its emitter connected to negative battery source 99 through resistor 109. Adjustment of variable resistor 160 affects the phase of the signal without affecting its amplitude. Capacitor 110 supplies the signal appearing at the collector electrode of transistor 106 to the base of transistor 111 which has an emitter follower resistor 112 in the emitter circuit thereof. A tap 113 functions to supply a portion of the signal appearing across said emitter follower resistor 112 to the amplifier 114 through coupling capacitor 115. More specifically, such signal is supplied to the base of transistor 116 which has its collector electrode connected to a positive battery source 117 through resistor 118 and its emitter connected to negative battery source 119 through resistor 120. The resistors 121 and 122 form a collector divider to provide proper biasing potential to the base of transistor 116.

From the collector electrode of transistor 116 an output signal is supplied to the base of transistor 129 which has an emitter follower resistor 143 connecting its emitter electrode to minus battery source 119. The signal appearing across the emitter follower resistor 143 is supplied through coupling capacitor 123 to quench gate 124. The quench gate 124 is really two gates in series with each other for the purpose of obtaining greater rejection of the signal at times other than the quench time. One of such quench gates is comprised of resistor 125, PNP type transistor 126, and resistor 127. A voltage divider comprised of resistors 130 and 131 is connected across a plus battery source 132 and the quench gate input pulse source 48' and has a tap 134 thereon to which is connected the base of transistor 126. Under normal operating conditions, i.e., in the absence of a pulse supplied from quench gate pulse source 48', the potential at said tap 134 will cause the transistor 126 to be conductive, thereby providing a path to ground for any signals appearing at the junction 135. Resistor 125 performs an isolating function between junction 135 and the emitter follower circuit 139. The operation of the second quench gate comprised of transistor 136 and resistors 137 and 138 performs in a manner similar to the first gate just described. Resistor 140 functions as an isolating resistor between the junction 141 and the junction 135.

In the presence of a quench gate pulse supplied to the quench gates, the voltages applied to the base electrodes of both transistors 126 and 136 are increased to a point where the transistors 126 and 136 become nonconductive. The high impedance presented to junctions 135 and 141 permit a signal to pass through the lead 142 to the input of amplifier 41'.

For one specific embodiment of the invention the following circuit values may be employed:

| | | | |
|---|---|---|---|
| R-48 | 82K | R-140 | 1.2K |
| R-49 | 27K | R-138 | 6.8K |
| R-52 | 3.3K | R-126 | 1.2K |
| R-53 | 1.8K | R-130 | 6.8K |
| R-152 | 3.3K | R-127 | 1.2K |
| R-150 | 1.5K | R-131 | 3.3K |
| R-151 | 3.3K | R-143 | 2.2K |
| R-61 | 27K | R-118 | 6.8K |
| R-153 | 150K | R-120 | 680 |
| R-154 | 15K | R-156 | 2.2K |
| R-66 | 6.8K | R-121 | 150K |
| R-67 | 680K | R-122 | 15K |
| R-72 | 3.3K | R-142 | 6.8K |
| R-81 | 15K | R-63 | 27K |
| R-82 | 12K | C-45 | µf .01 |
| R-84 | 12K | C-54 | µf 1 |
| R-87 | 6.8K | C-64 | µf .01 |
| R-88 | 150Ω | C-74 | µf 1 |
| R-89 | 10K | C-33 | µµf 1–14 |
| R-155 | 56K | C-93 | µµf 500 |
| R-101 | 56K | C-94 | µµf 1000 |
| R-102 | 10K | C-95 | µµf 500 |
| R-98 | 8.2K | C-110 | µµf 500 |
| R-100 | 1.5K | C-115 | µf .01 |
| R-108 | 3.3K | C-123 | µf 1 |
| R-109 | 3.3K | L-91 | mh 33 |
| R-110 | 5K | L-92 | mh 33 |
| R-137 | 3.3K | | |

The following transistors can be used:

| | | | |
|---|---|---|---|
| Q-47 | 2N697 | Q-106 | 2N697 |
| Q-58 | 2N428 | Q-111 | 2N697 |
| Q-55 | 2N697 | Q-116 | 2N697 |
| Q-71 | 2N697 | Q-129 | 2N697 |
| Q-77 | 2N697 | Q-126 | 2N428 |
| Q-78 | 2N697 | Q-136 | 2N428 |
| Q-97 | 2N697 | Q-144 | 2N697 |

It is to be noted that the forms of the invention shown and described herein are but preferred embodiments thereof and that various changes may be made in circuit arrangement, circuit design, and in component values without departing from the spirit or the scope of the invention.

I claim:
1. An electronic wave-shaping circuit comprising:
  crystal resonator means having a resonant frequency $f_0$ and consisting of:
    (a) crystal means;
    (b) input circuit means and output terminal means;
    (c) said input circuit of said crystal resonator means comprising a transformer having a primary winding and a secondary winding with a center tap connected to a reference potential,
    (d) said crystal means being connected between a first end terminal of said secondary winding and the output terminal means of said crystal resonator means,
    (e) and capacitor means of the order of magnitude of the inherent shunt capacitance of said crystal means being connected between the other end terminal of said secondary winding and the output terminal means of said crystal resonator means,
  means for supplying to said input circuit means an input signal including a tone having a frequency $f_0$;
  said input signal being comprised of a succession of time synchronous data bits of information with the nature of each bit of information being determined by the phase thereof with respect to a reference phase,
  means for supplying said reference phase;
  feedback circuit means responsive to the signal appear- ing at the output terminal means of said crystal resonator means to supply to said input circuit means of said crystal resonator means a signal 180° out of phase with the said input signal;

switching means constructed to operate in predetermined time relationship with said bits of said input signal and to successively connect said input signal to the input circuit means of said resonator, disconnect said input signal from said input circuit means after a given interval of time, and after another predetermined interval of time complete said feedback circuit to the input circuit means of said crystal resonator means to squelch the resonant condition therein, and means for timing said switching means to provide time correlation between the received information data bits and the operation of said switching means.

2. Keyed filter means for receiving a time synchronous tone signal having a frequency $f_0$ and in which the contained information during each time synchronous data bit interval is determined by the phase of the tone during said synchronous time interval with respect to a reference phase, said keyed filter means consisting of:

crystal resonator circuit means comprising a crystal, input circuit means, an output terminal means, and a natural resonance frequency $f_0$;

synchronizing means constructed to produce output pulses which bear a synchronous relation with the bit rate of said time synchronous tone signals;

first gating means responsive to output pulses from said synchronizing means to gate the received tone signals to said crystal resonator circuit means during a portion of the recurring time intervals of said time synchronous tone signal;

feedback circuit means including second gating means responsive to the output signal of said crystal resonator circuit means and output pulses from said synchronizing means to supply to the input circuit means of said crystal resonator circuit means a quenching signal whose phase is 180° removed from the phase of the oscillations of the crystal;

said synchronizing means and said second gating means being constructed to quench said crystal a predetermined time interval after the termination of the supplying of the tone signal to said crystal resonator circuit means;

the input circuit means of said crystal resonator circuit means comprising a transformer having a primary winding and a secondary winding with a center tap connected to a reference potential, the crystal of said crystal resonator circuit means being connected between a first end terminal of said secondary winding and the output terminal means of said crystal resonator circuit means, and capacitor means of the order of magnitude of the inherent shunt capacitance of said crystal being connected between the other end terminal of said secondary winding and the output terminal means of said crystal resonator circuit means.

References Cited in the file of this patent
UNITED STATES PATENTS

| | | |
|---|---|---|
| 2,825,808 | Doelz et al. | Mar. 4, 1958 |
| 2,881,317 | Hartke | Apr. 7, 1959 |
| 2,905,837 | Barry | Sept. 22, 1959 |
| 2,939,089 | Fedde | May 31, 1960 |
| 3,056,890 | Stoops et al. | Oct. 2, 1962 |